United States Patent
Wu et al.

(10) Patent No.: US 7,776,141 B2
(45) Date of Patent: Aug. 17, 2010

(54) METHODS AND APPARATUS FOR PERFORMING FLUE GAS POLLUTION CONTROL AND/OR ENERGY RECOVERY

(75) Inventors: Song Wu, Livingston, NJ (US); Takanori Nakamoto, Kurc (JP); Takashi Muramoto, Kurc (JP); Udo Zirn, Morristown, NJ (US); Toshio Katsube, Kurc (JP); Hirofumi Kikkawa, Hiroshima (JP)

(73) Assignee: Hitachi Power Systems America, Ltd., Basking Ridge, NJ (US)

( * ) Notice: Subject to any disclaimer, the term of this patent is extended or adjusted under 35 U.S.C. 154(b) by 159 days.

(21) Appl. No.: 11/861,245

(22) Filed: Sep. 25, 2007

(65) Prior Publication Data

US 2009/0078177 A1    Mar. 26, 2009

(51) Int. Cl.
   B01D 53/06    (2006.01)
   B01D 53/50    (2006.01)
(52) U.S. Cl. .......................................... 96/150; 110/203
(58) Field of Classification Search .................... 96/150; 95/107, 134, 137; 110/203, 233, 345; 423/210, 423/242.1, 244.01
   See application file for complete search history.

(56) References Cited

U.S. PATENT DOCUMENTS

| 4,273,747 | A | * | 6/1981 | Rasmussen ................. 423/210 |
| 4,664,893 | A | * | 5/1987 | Sarapata et al. ........ 423/244.08 |
| 5,024,169 | A | * | 6/1991 | Borowy ................... 110/165 A |
| 5,171,552 | A | * | 12/1992 | Miura et al. ............. 423/239.1 |
| 5,282,430 | A | * | 2/1994 | Nehls, Jr. .................... 110/345 |
| 5,554,350 | A | * | 9/1996 | Gurvich et al. .......... 423/239.1 |
| 6,027,551 | A | * | 2/2000 | Hwang et al. .................. 95/134 |
| 6,203,598 | B1 | * | 3/2001 | Hasegawa et al. ............... 95/92 |
| 6,528,030 | B2 | * | 3/2003 | Madden et al. ............. 423/210 |
| 7,223,375 | B1 | * | 5/2007 | Cochran ..................... 423/210 |
| 7,374,733 | B2 | * | 5/2008 | Taylor et al. ................ 423/210 |
| 7,387,662 | B2 | * | 6/2008 | Ahman et al. .................. 95/108 |
| 2004/0042280 | A1 | | 3/2004 | Nagashima et al. |
| 2005/0036926 | A1 | * | 2/2005 | Lissianski et al. ........... 423/210 |
| 2006/0008394 | A1 | | 1/2006 | Muramoto et al. |
| 2006/0144043 | A1 | | 7/2006 | Takeuchi et al. |
| 2008/0314242 | A1 | * | 12/2008 | Cochran et al. ................... 95/1 |
| 2009/0056538 | A1 | * | 3/2009 | Srinivasachar et al. ......... 95/58 |

FOREIGN PATENT DOCUMENTS

JP    06-238127    8/1994

* cited by examiner

*Primary Examiner*—Frank M Lawrence
(74) *Attorney, Agent, or Firm*—Straub & Pokotylo; Michael P. Straub

(57) ABSTRACT

Methods and apparatus for pollution control which are well suited for use in a coal power plant are described. Ash is collected and injected into the flue gas stream at a location upstream of a cooling module. The ash acts as an absorbent and/or reactant material onto which condensate may condense. By re-introducing ash to keep the condensation forming wet areas within the system, lower cost materials which are less corrosion resistant than needed for wet operating conditions can be used. Mercury recovery and SO3 removal is facilitated by the cooling process and re-introduction of collected ash. Activated carbon and/or an alkali absorbent material may be added. Use of a dry ESP and/or fabric filter as opposed to a wet ESP for particulate collection leads to cost benefits. Energy recovered by the cooling of the flue gas may be re-used to heat turbine condensate leading to improved energy efficiency.

16 Claims, 12 Drawing Sheets

METHODS AND APPARATUS FOR PERFORMING FLUE GAS POLLUTION CONTROL AND/OR ENERGY RECOVERY

FIELD OF THE INVENTION

This invention relates to flue gas systems, e.g., methods and apparatus for processing flue gas streams for pollution control purposes and/or energy recovery.

BACKGROUND OF INVENTION

Coal is an abundant energy source and is expected to remain the dominant fuel for power generation at least through the first half of this century. Today coal-fired power plants must meet stringent environmental requirements with regard to the byproducts they produce.

One of the byproducts of power plants and turbine engines is exhaust gas, commonly known as flue gas. This gas may contain components which are harmful to the environment, such as oxides of nitrogen ($NO_x$). The production of $NO_x$ can occur when fossil fuels are combusted such as in refinery heaters, steam boilers, etc.

Plants which burn coal and/or other fuels in many cases are required to control $SO_2$, $NO_x$, and CO and particulate matter. In addition on limits to these byproducts, modern plants may be required to control emission of mercury, $SO_3/H_2SO_4$, condensable particulate matter, various trace metals and/or acid gases.

Presently for $SO_3/H_2SO_4$, condensable PM control, power plants often use wet electrostatic precipitator (WESP), or alkali sorbent injection without gas coolers, or a combination of the two to meet emission limits, with high capital and operating costs.

A wet ESP operates at temperatures below the sulfuric acid dew point and collects the $H_2SO_4$ and other condensable matters in the form of liquid mists. Therefore, all internal components of WESP that are exposed to the gas stream, as well as the flue ducts connecting the WESP must be made of corrosion-resistant material, generally very expensive alloys. The WESP has become one of the most expensive devices for power plant pollution control. Additionally, WESP has higher power consumption and significantly reduces plant net output efficiency. Alternately various alkali sorbent injection systems installed at lower capital costs than WESPs. However, they require continuous injection of sorbent material (typically sodium, magnesium or calcium based) and therefore add significantly to plant operating cost. Sorbent injection also introduces external substance to combustion byproducts (flyash) and therefore can affect its utilization options.

In some known systems gas coolers have been used to cool the flue gas prior to processing by a dry electrostatic precipitator (ESP) or fabric filter (FF) used to remove particulate matter. Energy may be recovered as part of the cooling process and used elsewhere in the system, e.g., to re-heat the flue gas after processing and prior to emission through a smoke stack thereby reducing the amount of visible condensate at the top of the stack and giving the power plant a much cleaner looking and less visible output.

The cooling of the gas prior to ESP or FF processing facilitates pollution control and allows for the use of dry as opposed to wet flue gas processing techniques. However the cooling has the side effect of producing condensate which tends to be rather corrosive.

One known system which uses a selective catalytic reduction (SCR) process to treat flue gas is shown in FIG. 1. The known system 100 includes a boiler 102, an SCR module 106, an air heater 110, a gas cooler 114, a particulate removal device in the form of an electrostatic precipitator and/or fabric filter (ESP/FF) 120. The system 100 also includes an induced draft fan (IDF) 124 for forcing the flue gas into a flue gas inlet 128 of a wet flue gas desulfurization device 130 which is a vessel where the flue gas is treated, e.g., using limestone or other reactants prior to the gas being discharged through a smoke stack 140. As part of the treatment process, condensate and/or limestone is pumped by pump 136 though pipe 134 and nozzles 138 which are used to add reactants and/or condensate to the flue gas as it passes through the WFGD 130.

Depending on the amount of condensation caused by the use of the gas cooler 114 and various conditions including the weather which may impact humidity, the known system 100 may suffer from clogging of the gas cooler due to clumping of wet ash. This can occur when the amount of dry material in the flue gas stream is insufficient to absorb all of the condensate. In addition, as discussed above, the known system 100 has the disadvantage of being costly to implement due to the use of stainless steel and/or other corrosion resistant materials to implement portions of the gas cooler 114 such as the cooling tube bundles shown by the wavy line between the fluid input 142 and fluid output 118 through which a cooling fluid is passed.

FIG. 2 illustrates a known system 200 similar to that of FIG. 1. Elements of FIGS. 1 and 2 which are the same are indicated using the same reference numbers. In FIG. 2, energy extracted by the gas cooler 114 is recovered by an energy recovery module 210 which operates in combination with pump 204. The pump 204 pumps cooling fluid from its inlet 208, through its outlet 44. The cooling fluid circulates through gas cooler 114 absorbing heat from the flue gas before passing though outlet pipe 206 to the input of the energy recovery module 210. The energy recovery module 210 is implemented as a heat exchange unit with heat being transferred from the cooling fluid to a heat transfer solution which exits the energy recovery module 210 at outlet 212. In the known system 200 the recovered energy is used to heat the flue gas after treatment in the WFGD thereby raising the outlet temperature of the flue gas exhausted through smoke stack 140. The heating of the flue gas prior to exhausting has the advantage of reducing the visible condensation at the smoke stack outlet. However, it does not improve overall efficiency since the energy used to heat the flue gas achieves what is largely a cosmetic result while requiring heat energy. While not necessary, it would be desirable if a more beneficial use, e.g., in terms of energy efficiency, could be developed for the energy recovered from the gas cooler.

Unfortunately, as noted above, existing systems which use gas coolers tend to be expensive due to the cost of corrosion resistant materials, such as stainless steel, used to implement the gas coolers. In addition, with the conventional systems which use gas coolers, there is a potential for clogs and/or other problems due to combustion by products clumping and blocking the flue gas path as the combustion byproducts become wet due to condensation which occurs during the cooling process. As mentioned above, this is because wet materials may build up on the heat exchange surfaces of the gas cooler blocking the flow of the flue gas. The cleaning of such suffices when a clog occurs can interfere with normal system operation and/or result in costly service.

Given that systems using gas coolers can be simpler to implement than systems using WESP, it would be desirable if methods and/or apparatus could be developed which would address one or more of the known problems including, for example, the requirement that the flue gas cooler be implemented using large amounts of corrosion resistant materials such as stainless steel and the tendency for combustion byproducts to become wet, clump, and block the flow of flue gas. Thus, it would be beneficial if method and/or apparatus were developed which reduced the amount of corrosion resistant materials needed to implement a reliable flue gas cooler and/or which reduced the tendency for clogs and/or clumping to occur. While not critical, it would also be beneficial if new uses for the recovered energy which can be obtained from the use of a flue gas cooler were developed which would allow for improved overall energy efficiency as compared to the known systems discussed above.

SUMMARY OF THE INVENTION

The methods and apparatus of the present invention allow for pollution control in a wide variety of applications. The techniques are particularly well suited for coal power plant applications.

Various methods and apparatus of the present invention differ significantly from the known systems in that ash is collected and reintroduced into the flue gas stream. Novel use of recovered ash as an input which is fed back into the flue gas stream. The portion of collected ash which is re-introduced into the flue gas stream may be predetermined based on known conditions such as the type of coal and climate or may be dynamically determined based on the output of one or more sensors, e.g., temperature, pressure, and/or gas composition, sensors.

In addition to using recovered ash as an absorbent additive which is injected into the flue gas stream, various embodiments of the invention use recovered energy from a flue gas cooling element of the system in a way that provides improved system efficiency and not merely cosmetic benefits in terms of the appearance of the smoke stack output. In some but not necessarily all embodiments recovered heat is used to heat one or more flue gas stream additives, e.g., ammonia, supplied to an selective catalytic reactor (SCR), or to heat the condensate from the steam turbine.

The collected ash which is re-introduced into the flue gas stream may be recovered at any of a variety of points in the system including, for example, from a gas cooler, particulate removal device such as a dry electrostatic precipitator or fabric filter. The collected ash obtained from one or more devices within the system may be stored in an ash hopper or silo prior to re-introduction into the flue gas stream. The novel approach to collecting and using ash, e.g., coal fly ash, turns what was formerly an unwanted waste product into a useful additive which can avoid, eliminate or reduce any need for other absorbent materials being added to the flue gas stream.

Thus, in the novel system of the invention recycled ash acts as an absorbent and/or reactant material. By adding sufficient ash back into the flue gas stream, condensation can be absorbed thereby avoiding clogging and clumping problems that may occur in the known system. In addition, by absorbing the condensation and thus acting as a protective agent within the system against the effects of liquid condensate which can be highly corrosive, the need for highly corrosion resistant materials can be reduced or avoided in various system components.

Thus, it should be appreciated that the method and systems described in this applications address one or more of the shortcomings of the current pollution control technologies for $SO_3$ and condensable PM. The exemplary embodiments disclosed here not only control pollutants at a fraction of the cost of systems which use wet ESP technologies or approaches which require large amounts of non-corrosive material in a gas cooler, but the approaches of the invention may, depending on the embodiment, increase plant electricity output and efficiency through the beneficial use of recovered heat energy. Thus, various embodiments have advantages over one or more of the known systems with regard to one or more of the following: i) initial system implementation costs, ii) ongoing costs associated with regard to additives which may be used for pollution control and ii) increased energy efficiency.

In one but not necessarily all exemplary embodiments of the proposed system, a tubular gas cooler with an extended heat transfer surface is utilized to reduce the flue gas temperature from approximately 300 F to 200 F or lower. During this cooling process, much of the $SO_3$ and other condensable gases are adsorbed by and condense into the fine flyash present in the flue gas. The adsorbed $SO_3$ is further neutralized by the inherent alkalinity in the flyash. This process removes significant amounts of $SO_3$ provided the flue gas particularly in cases where, as in various embodiments, the flue gas is cooled down to below 220 F.

In some embodiments the energy recovered by the gas cooler is used to heat up the turbine condensate prior to reuse of the condensate. This energy can be used to completely or partially replace the steam sometimes required for the first and/or second stage condensate heaters. The steam to heat the condensate is typically extracted from the steam turbine. The reduced steam extraction from the steam turbine results in an increase of turbine generator power output with the same fuel consumption and therefore increases net plant efficiency as compared to some plants which do not use the recovered heat in this manner.

The techniques are particularly well suited for use with coal-fired power plants where pollution control and energy recovery can be important. With growing desire for reducing green house gas emissions and/or other pollutants the proposed system may find applications in a wide variety of applications and is not limited solely to coal fired power plant applications.

Additional features and benefits of the present invention are discussed in the detailed description which follows.

DETAILED DESCRIPTION

The methods and apparatus of the present invention for processing flue gas stream can be used with a wide range of furnace environments. For example the invention can be used with power plants, refineries, or other instances of the use of turbine engines, heaters, steam boilers, etc.

Figure 3:
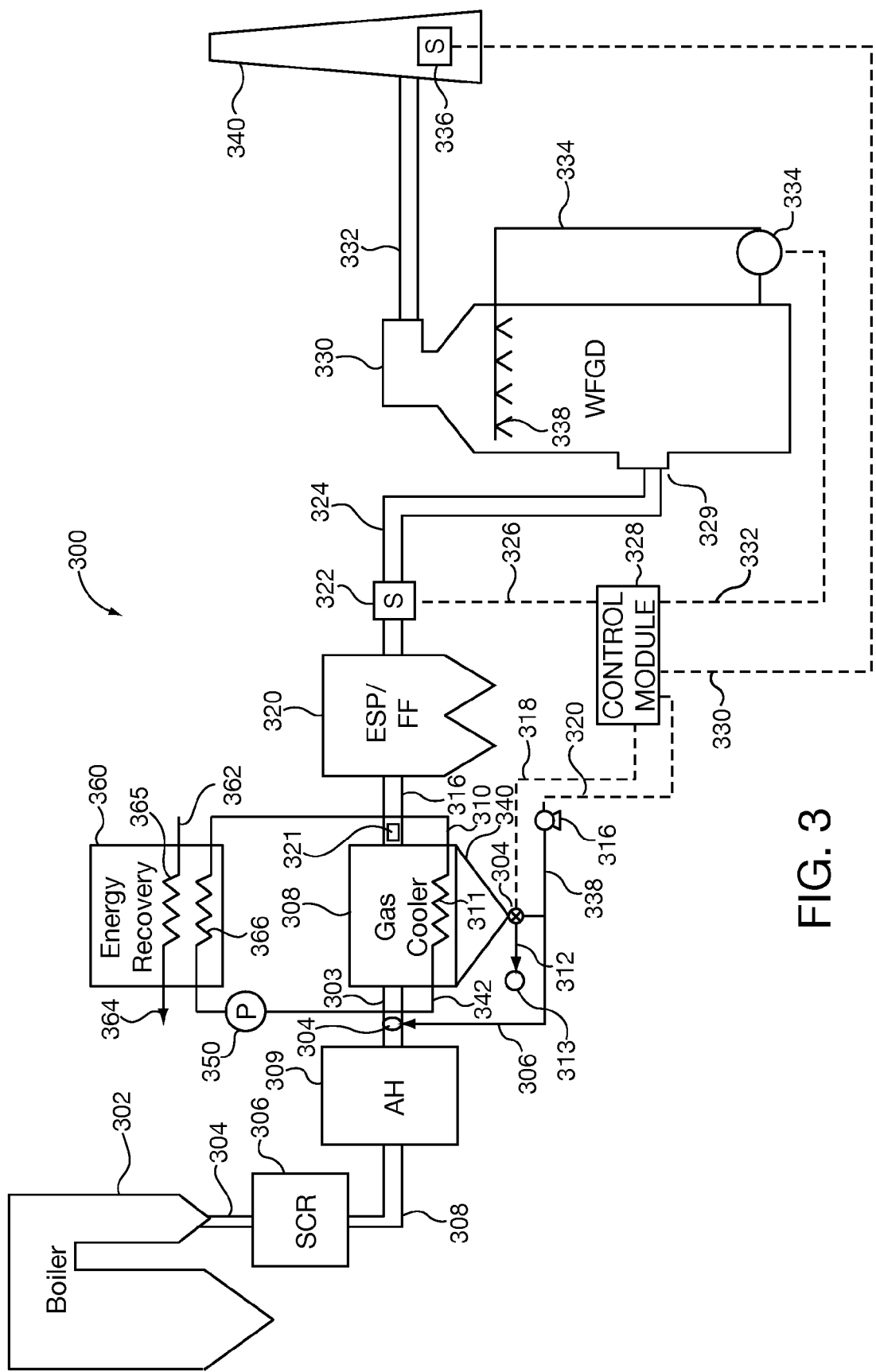
FIGS. 3 illustrates an exemplary system implemented in accordance with the invention in which ash is recovered and injected back into a flue gas stream upstream of a flue gas cooler.

FIG. 3 illustrates a first exemplary system 300 implemented in accordance with the present invention, e.g., a power plant. The system 300 includes various elements which work in combination as an Air Quality Control System (AQCS) for controlling $SO_3$ and condensable particulate matter (PM) emissions. Various embodiments of the system 300 are particularly well suited for coal furnace applications, e.g., in cases where medium to high sulfur coal may be used creating a need to control $SO_3$ emissions.

Figure 1:
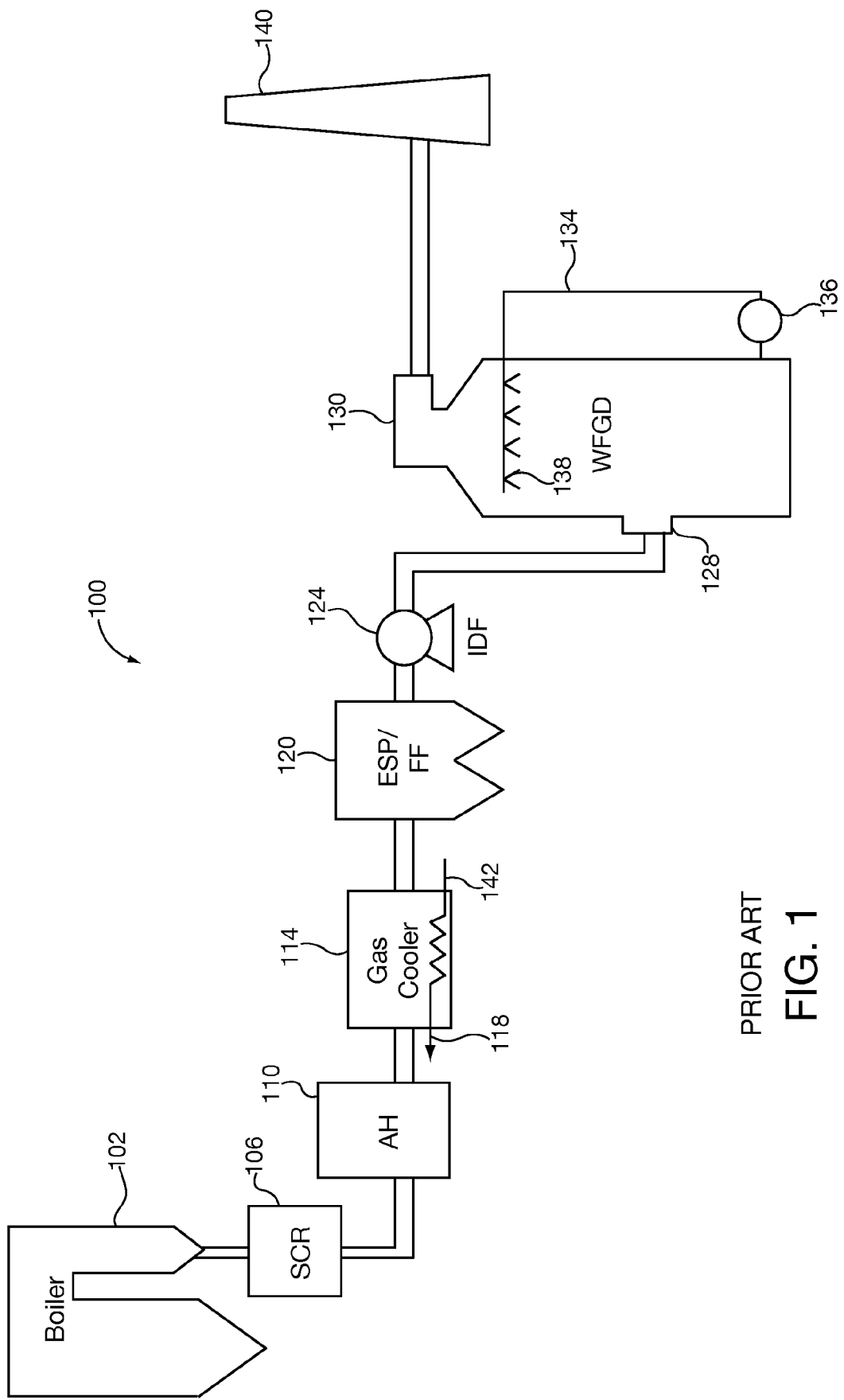
FIG. 1 illustrates a known generating system in which a gas cooler is used before processing by an ESP/FF.
Figure 2:
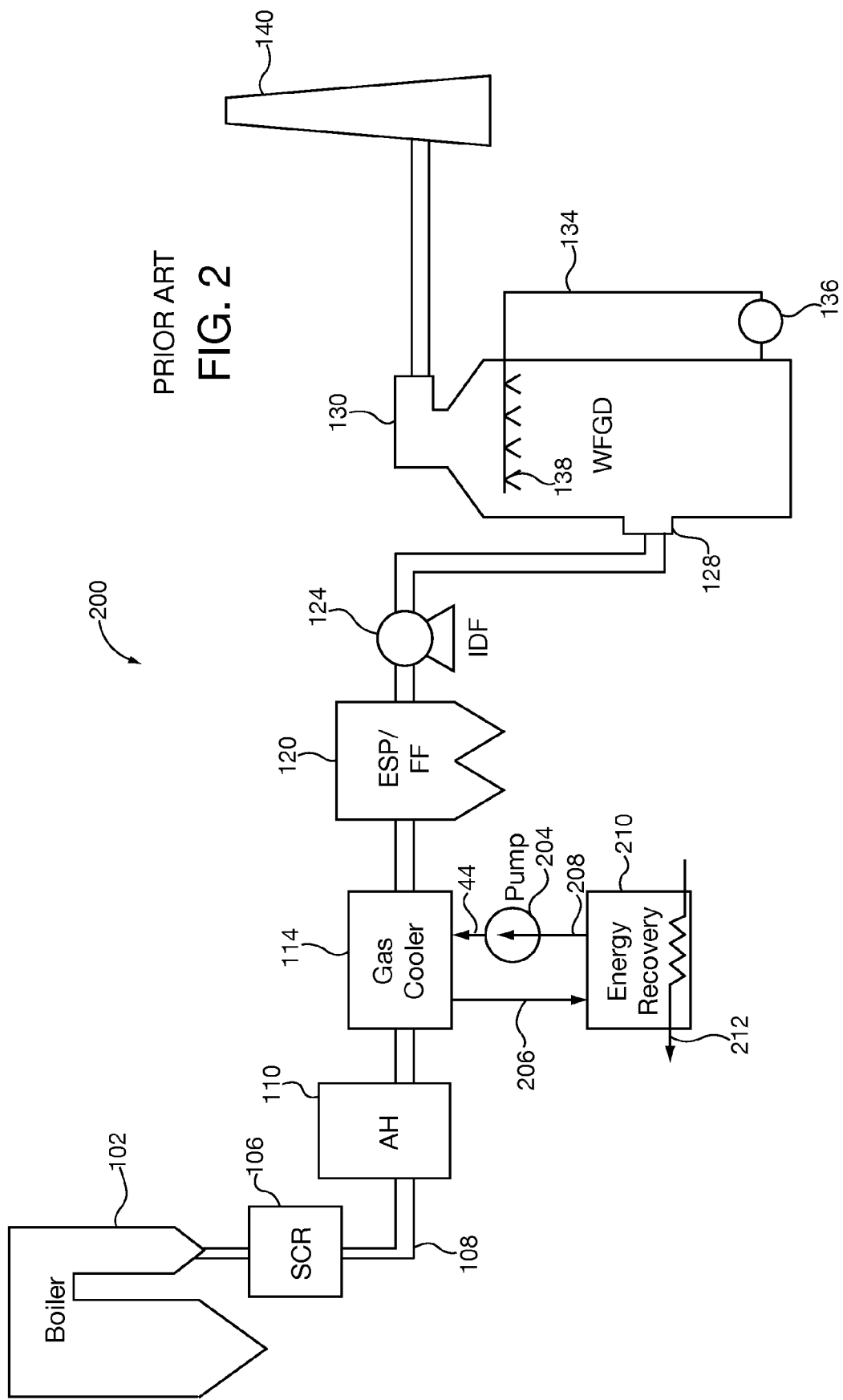
FIGS. 2 illustrates a known system which is similar to the system of FIG. 1 but wherein an energy recovery device is used to recover energy as part of the flue gas cooling process which is then used to heat the flue gas after ESP/FF processing prior to the gas being emitted from a smoke stack.

The system 300 implemented in accordance with the invention includes several components which operate in a manner similar to those previously discussed with regard to the known systems shown in FIGS. 1 and 2. However, the system 300 of the present invention differs significantly from the known systems in its novel use of recovered ash as an input which is fed back into the flue gas stream. In addition, it differs from the known system by using recovered heat to heat one or more flue gas stream additives, e.g., ammonia, supplied to an SCR 306, or to heat turbine condensate, rather than using recovered heat to heat flue gas before it is exhausted via a smoke stack 340. The addition of the recovered as, which may be collected at any one of a variety of locations in the system as will be discussed below, turns a waste product into a useful additive. In the system 300 the recycled ash acts as an absorbent and reactant material. By adding sufficient ash back into the flue gas stream, condensation can be absorbed thereby avoiding clogging and clumping problems that may occur in the known system. In addition, by absorbing the condensation and thus acting as a protective agent within the system against the effects of liquid condensate which can be highly corrosive, the need for highly corrosion resistant materials can be reduced or avoided in various system components.

The known system 300 includes a boiler 302, an SCR module 306, an air heater 310, a gas cooler 308, a particulate removal device 320 in the form of a dry electrostatic precipitator and/or fabric filter, a wet flue gas desulfurization device 330, and a smoke stack 340. One or more induced draft fans may be used to force the flue gas through the ducts 304, 308, 302, 316, 324 and 332 coupling the various elements of the system 300 together. Throughout the system various sensors may be positioned to measure such things as flue gas temperature, pressure, composition, fly ash volume, etc. In the illustrated system 300, sensor 322 is located at the outlet of the particle removal device 320 while another sensor or set of sensors 336 is located in the smoke stack 340. A sensor 321 located at the outlet of gas cooler 308 may also be used. A control module 328 is coupled to the sensors 321, 322, 336. In the illustrated embodiment, control module 328 serves to control various valves, pump and blowers. For example, control module 328 controls a pump 334 used to pump limestone slurry through pipe and jets 338 to thereby pump an limestone-gypsum slurry to the top of the WFGD unit 338 where it is sprayed into the exiting flue gas.

As discussed above, in accordance with the present invention ash is collected and then at least a portion of the collected ash is recirculated by injecting some or all of the collected ash into the flue gas stream at a point upstream of the gas cooler. In the system 300, ash is collected in a hopper 340 at the bottom of gas cooler 308. The control module controls a blower 316 and a valve 304 used to control movement of the collected ash from the hopper 340. The control module 328 controls valve 304 to direct a desired portion of the ash into pipe 338 where it is forced by blower 316 through pipe 306 which connects the outlet of the ash hopper 340 into nozzle 304 which is used to inject the ash into the flue gas inside duct 302 which supplies the flue gas including the injected ash to the gas cooler 308. The nozzle 304, alone or in combination with the pipes and valves used to supply the ash to the nozzle, operate as an ash injection module. The nozzle 304 may be implemented as one or more openings in pipe which are positioned at a point inside duct 302. In addition to being used to direct ash from hopper 340 into pipe 338, the valve 304 can be used to direct ash to an ash disposal port 313, e.g., for disposal. In some embodiments, the control module 328 provides dynamic control of the amount of collected ash injected back into the flue gas stream with the amount being determined based on one or more flue gas conditions which are sensed by the sensors 321, 322, 336 in the system. In other embodiments the amount of ash which is fed back into the system is predetermined based on known parameters such as the type of coal and planned operating conditions. In such a case, the settings for the blower 316 and valve 304 can be fixed with the fixed settings being such that the intended amount of collected ash for the expected operating conditions will be re-injected into the flue gas stream.

To improve overall efficiency, an energy recovery module 360 is used to recover energy extracted by the flue gas cooler 308. A closed loop process is used to convey heat extracted from the flue gas to the energy recovery module 360 where a heat exchanger 365, 366 is used to transfer the heat to a fluid passing through the heat transfer portion of the energy recovery module extending from inlet 362 to outlet 364. The heat exchanger 365 is used, in some embodiments to preheat a material, e.g., liquid ammonia, to be injected into the flue gas stream. In other embodiments, the heat exchanger 365 is used to heat up turbine condensate prior to reuse of the condensate. In some embodiments, the turbine condensate may be used directly as coolant in the heat exchanger 311 in gas cooler 308. This energy can be used to completely or partially replace the steam sometimes required for the first and/or second stage condensate heaters found in many power plant systems.

In order to transfer heat to the fluid passing through heat exchanger 365, fluid is pumped by pump 350 through gas cooler fluid inlet, through the heat exchanger 311 used to extract heat from the flue gas, and then from outlet 342 through heat exchanger 366 in the energy recovery module. Heat exchanger 366 is used to transfer heat to the heat exchanger 365 through which the fluid to be heated passes. From the outlet of heat exchanger 366 the heat transfer fluid is re-circulated to the inlet 303 of the gas cooler heat exchanger. While the heat recovery process is similar to that used in some known systems, the use of the recovered heat to preheat either the turbine condensate which is then further heated in the boiler or to preheat an additive to be injected into the flue gas saves energy as compared to other uses of the heat by serving to replace heat which would otherwise need to be extracted from the boiler 302. This is a more beneficial use of the recovered heat than simply using it to heat the flue gas entering the smoke stack which, while providing a way of disposing of the recovered heat, provides little more than some cosmetic benefits in terms of reducing the amount of visible plume and/or steam without providing any significant environmental or economic benefit.

As discussed above, in the system 300 the particulate collection device 320 can be an electrostatic precipitator (ESP) or a Fabric Filter (FF) or a combination of the two. The flue gas leaving the APH 310 for medium to high sulfur coals will typically contain 10-50 ppm or higher of $SO_3$ in the flue gas which is typically at a temperature of about 300 F.

In one embodiment of the system 300, a tubular gas cooler with extended heat transfer surface is utilized as the gas cooler 308. In one such embodiment the gas cooler 308 reduces the flue gas temperature from approximately 300 F to 200 F or lower. During the cooling process, much or most of the $SO_3$ and other condensable gases condense and are adsorbed by the fine flyash present in the flue gas. The adsorbed $SO_3$ is further neutralized by the inherent alkalinity in the flyash. As discussed above, sufficient fly ash is re-circulated after being collected to maintain dry operating conditions. In some embodiments where the flue gas is cooled down to below 220 F, this process removes much, and sometime almost all, of the $SO_3$ in the flue gas stream. In some typical embodiments, the $SO_3$ concentration in the flue gas exiting the proposed system is reduced to below 1 ppm.

As a measure to improve thermal life cycle efficiency, modern steam power plants, such as the one shown in FIG. 3, employ multiple stages of condensate/feedwater pre-heating. In the FIG. 3 example, the turbine condensate/feedwater is passed though heat exchanger 365 and heated from approximately 103 F to higher temperature prior to being passed through other heating elements to achieve a temperature of approximately 552 F. To reach a temperature of 552 F as many as eight stages of heaters may be used with the later stages obtaining the heat from the burning of fuel as opposed to recovery from another part of the system. Normally, and in the case of the FIG. 3 embodiment, the energy source of heating the condensate/feedwater in the later stages of the heating process is steam extraction from LP, IP and/or HP turbines.

In accordance with some embodiments of the invention, the energy recovered by the gas cooler 308 is used to heat up the turbine condensate in the early stages of the condensate heating process. This energy is used to completely or partially replace the steam required for first and/or second and/or third stage condensate heaters which would otherwise normally be employed to heat the condensate prior to the later, higher temperature heating stages. In some embodiments, the recovered heat is used to heat the turbine condensate to about 250 F. This avoids steam extraction from the LP turbine which would otherwise be required for the lower stages of the heating process and increases turbine generator power output with the same fuel consumption as compared to system which do not recover and use the recovered heat in this manner. Therefore, the use of recovered heat as done in the system of FIG. 3 can result in net increase in plant efficiency as compared to other systems which do not recover and use the recovered heat in the described manner. The heating of turbine condensate can be direct or indirect. In the direct heating mode, a fraction or all of the turbine condensate is sent to the gas cooler directly as the cooling medium. In the indirect heating mode, a separate cooling medium (e.g. water), may be used to cool the flue gas and the heat carried by this separate medium is used to heat turbine condensate.

As should be appreciated, the inventive system 300 shown in FIG. 3 includes one or more of the following features:

Flue gas cooling by a tubular heat exchanger 311 in a high dust environment before the particulate collection device 320 (ESP or FF).

Pollutants such as $SO_3$ that condense during cooling are adsorbed onto the flyash and are fully or partially neutralized by the inherent alkalinity of the flyash.

In case the inherent alkalinity of the flyash is not sufficient to neutralize the adsorbed pollutants such as $SO_3$, some, e.g., a small amount relative to the amount of injected fly ash, of alkali absorbent (e.g., calcium, magnesium or sodium based) may be injected upstream of the gas cooler. (See, e.g., FIG. 8 and 9 which illustrate other exemplary embodiments)

The heat recovered by the gas cooler 308 is used, directly or indirectly, to the heat turbine condensate.

The proposed system has one or more of the following advantages/benefits:

It removes much or almost all of the $SO_3$ by cooling the flue gas and by using the flyash's inherent alkalinity. Therefore the system 300 avoids the need for a wet ESP currently used for many high sulfur coal applications. Thus, the high capital and operating costs associated with using a wet ESP can be avoided.

The injection of collected ash eliminates or reduces the need for wet flue gas ducts and manifolds which like the wet ESP have to be made of costly, corrosion-resistant alloy materials.

Reduces wet FGD water consumption by as much as 50% by cooling the flue gas.

The recovered heat is incorporated in the plant thermal cycle. This contributes to a plant heat rate reduction and a plant power output and reduces $CO_2$ and all other emissions on a unit electricity output basis as compared to system which do not use the recovered heat in the described manner.

The approach also facilitates effective mercury removal for high sulfur bituminous coals by removing large amounts of $SO_3$ from the flue gas.

The methods and apparatus of the invention provide a new way to remove pollutants (mainly SO3) and to increase thermal cycle efficiency as compared to some known systems. By replacing the very expensive wet ESP and with heat recovery as a byproduct, the new process is very cost effective and practical to use.

Figure 10:
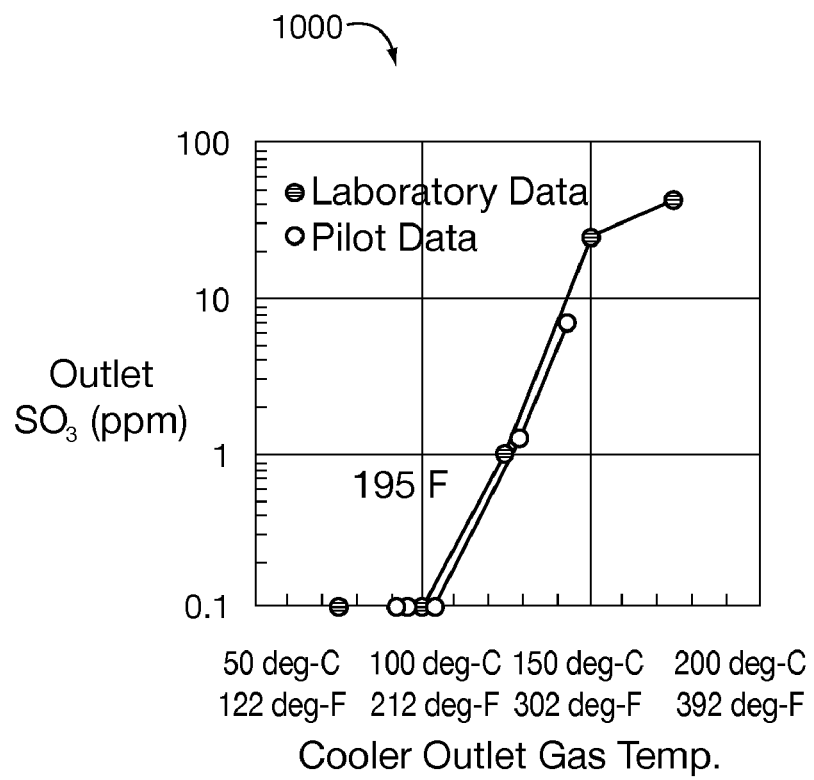
FIG. 10 shows pilot plant test data of $SO_3$ removal versus flue gas temperature achieved in one exemplary embodiment.

FIG. 10 shows the laboratory and pilot plant test data of $SO_3$ removal versus flue gas temperature exiting an experimental tubular gas cooler which may be used as the cooler 308. Both sets of data show that when flue gas is cooled to lower temperatures, more $SO_3$ is removed by the tubular cooler. With exit flue gas temperature below approximately 250 F, flue gas $SO_3$ concentration can be controlled to 1 ppm or less.

In the gas cooler, the $SO_3$ condenses and (in the form of $H_2SO_4$) deposits onto the surface of the ash particles. Sufficient amount of flyash is maintained through injection of collected ash to protect the tube surface from corrosion due to direct contact with the condensed sulfuric acid. Further, the condensed sulfuric acid is neutralized by the alkali compounds in the flyash.

To achieve sufficient control and neutralization of $SO_3$ condensates, a portion of the flyash captured in the dust collection device such as ESP or FF, up to the equivalent of 100% of the original flyash content in flue gas, is recycled and re-injected into the flue duct upstream of the tubular gas cooler 308.

While in the FIG. 3 embodiment used to explain various features of the invention, ash is injected between the AH 309 and gas cooler 308, the flyash maybe re-injected downstream or upstream of the air preheater 310, or upstream of the SCR reactor 306.

It is also possible to add an alkali material upstream of the gas cooler 308. Accordingly some embodiments support this feature. The alkali material, when used, could alternatively be injected downstream or upstream of the air preheater 310, or upstream of the SCR reactor 306. The alkali material maybe, and in some embodiments is, for example, calcium, magnesium, sodium and/or potassium-based. In some embodiments the alkali material is injected in dry powder form. Alternatively it may, and in some embodiments is, injected in the form of a water solution through atomizing nozzles inserted the flue gas duct.

A further application of the present invention is to enhance the mercury capture effectiveness of both flyash and activated carbon in the Air Quality Control System (AQCS).

Flyash generated by coal combustion has certain inherent capacity in capturing mercury in flue gas stream by adsorption. Usually flyash containing more unburned carbon (product of incomplete coal combustion) tends to remove more mercury from the flue gas. If additional mercury removal is desirable, finely divided activated carbon may, and in some embodiments is, injected upstream of the dust collection device 320, such as the ESP or the PJFF. The captured mercury together with the flyash and activated carbon is then separated from the flue gas by the dust collection device.

Figure 8:
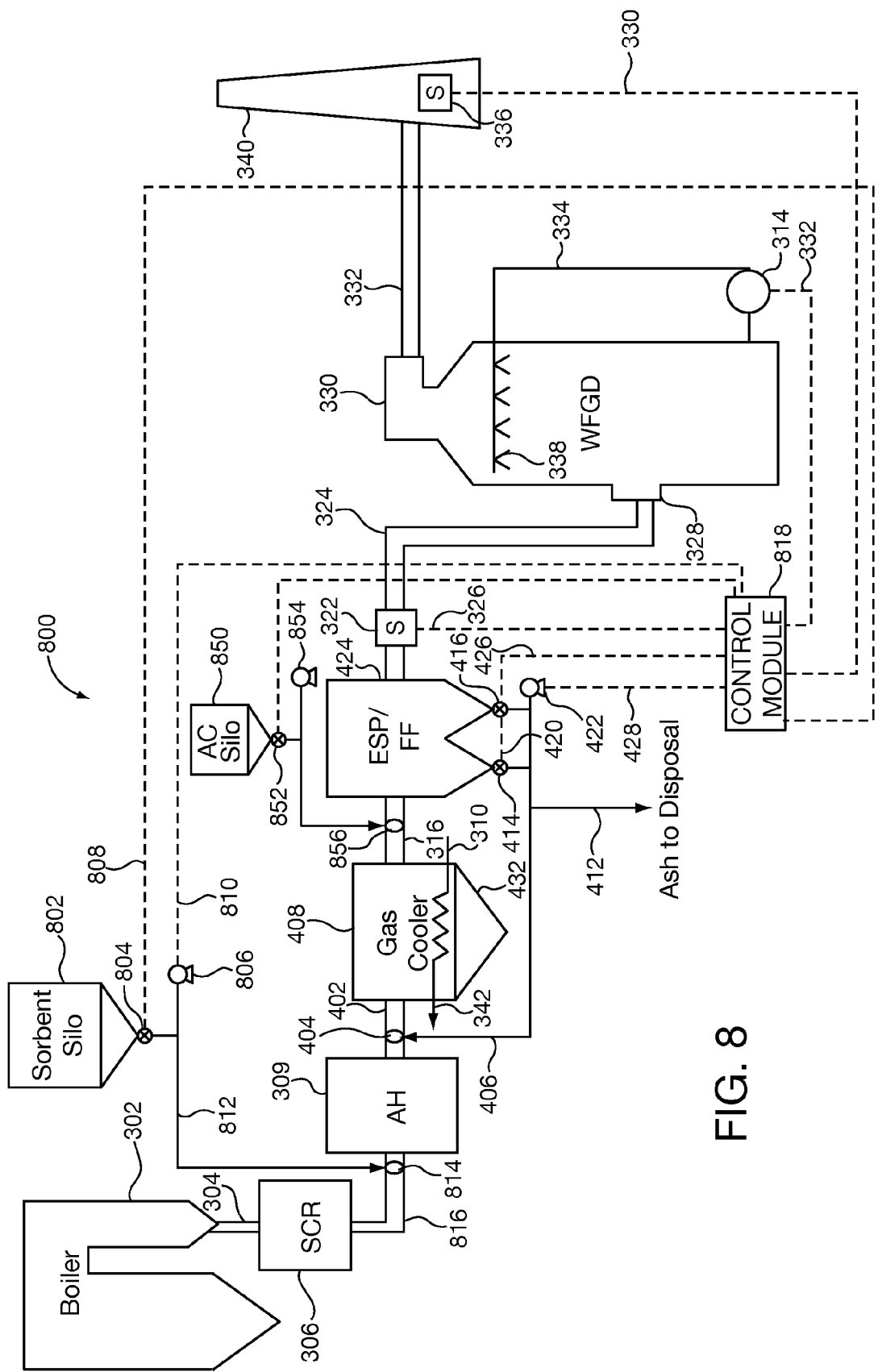
Figure 9:
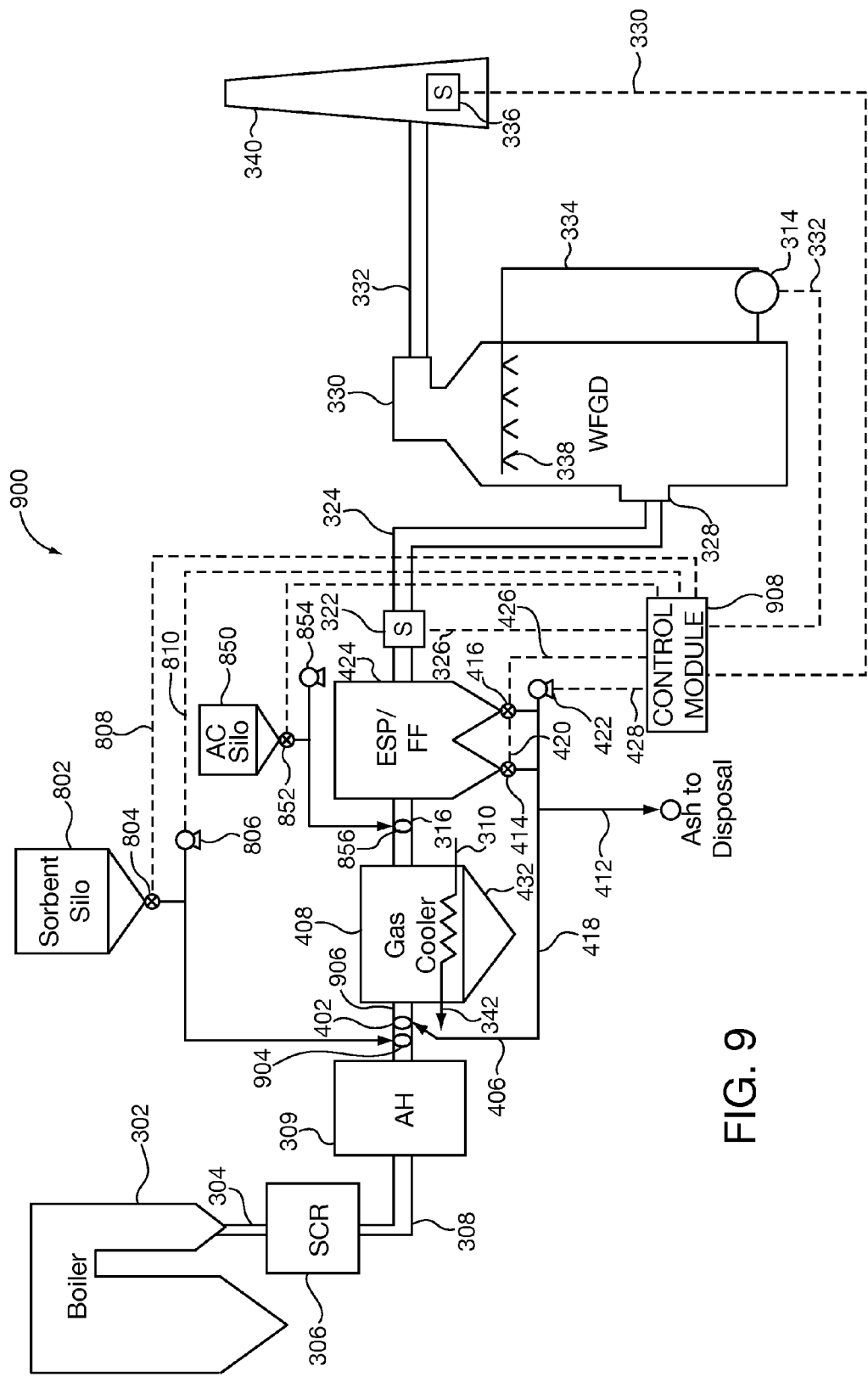

It has been found that mercury capture by both flyash and activated carbon injection is strongly affected by the gas temperature. At higher temperatures mercury capture by both flyash and activated carbon decreases. As discussed previously, in various embodiments the gas cooler 308 reduces the gas temperature from about 300 F to below 200 F or lower. Therefore the gas cooler enhances the effectiveness of both flyash and activated carbon for mercury capture. In case activated carbon is utilized it should be injected downstream of the gas cooler but before the dust collection device 320. FIGS. 8 and 9 which will be discussed further below illustrate embodiments which include support for activated carbon injection.

The presence of $SO_3$ in flue gas inhibits the mercury capture by flyash and activated carbon. $SO_3$ concentration as low as 5 ppm in flue gas can significantly reduce mercury removal performance. Since $SO_3$ formation is usually proportional to the fuel sulfur content, it is therefore more difficult to remove mercury from high sulfur fuel-fired plants. However, since the ash re-injection process of the present invention combined with gas cooling reduces $SO_3$ content, it should be appreciated that the methods and apparatus of the invention also facilitate mercury capture and removal.

FIGS. 4-9 show various embodiments of the invention which are similar to the FIG. 3 embodiment with some variations to show differences between some of the exemplary embodiments which are possible. Elements in FIGS. 4-9 which bear the same name and/or reference number as elements of FIG. 3 are the same or similar and will not be described in detail. The discussion of FIGS. 4-9 will focus primarily on the differences from the FIG. 3 embodiment which has already be described at length. It should be appreciated that while the energy recovery module shown in FIG. 3 is not shown in FIGS. 4-9, such a recovery module may be present and used in the embodiments of FIGS. 4-9 but has been omitted from these figures to simplify the drawings. In some embodiments, the turbine condensate may be used directly as coolant in the heat exchanger in the gas cooler.

Figure 4:
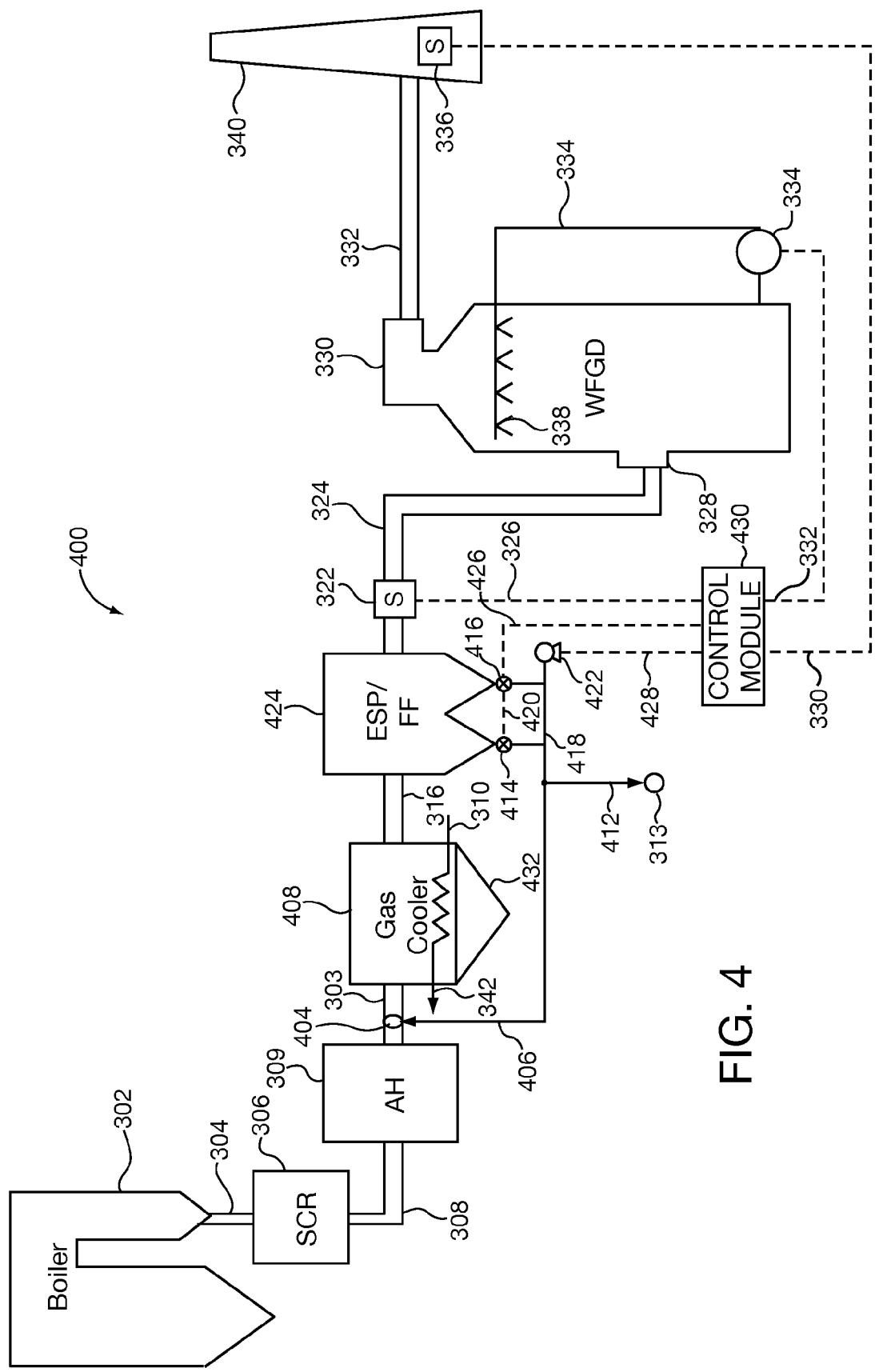
FIGS. 4 through 9 illustrate various embodiments of systems implemented in accordance with the invention which recycle ash and inject the ash into the flue gas stream at a location upstream of a flue gas cooler.

In the FIG. 4 embodiment, an as hopper 432 is shown on the gas cooler 408 and on the particulate collection device 424. Ash is collected in the hoppers of the ESP/FF 424 and supplied through valves 414, 416 under control of control module 430 via pipes 418, 406 to nozzle 404 which is used to inject the collected ash into the flue gas stream at a point between the AH 309 and gas cooler 408. The control module 430 controls a blower 422 and valves 414, 416 via control lines 428, 426 and 420, respectively. In the FIG. 4 system excess ash is discharged through outlet 313 via pipe 412.

Figure 5:
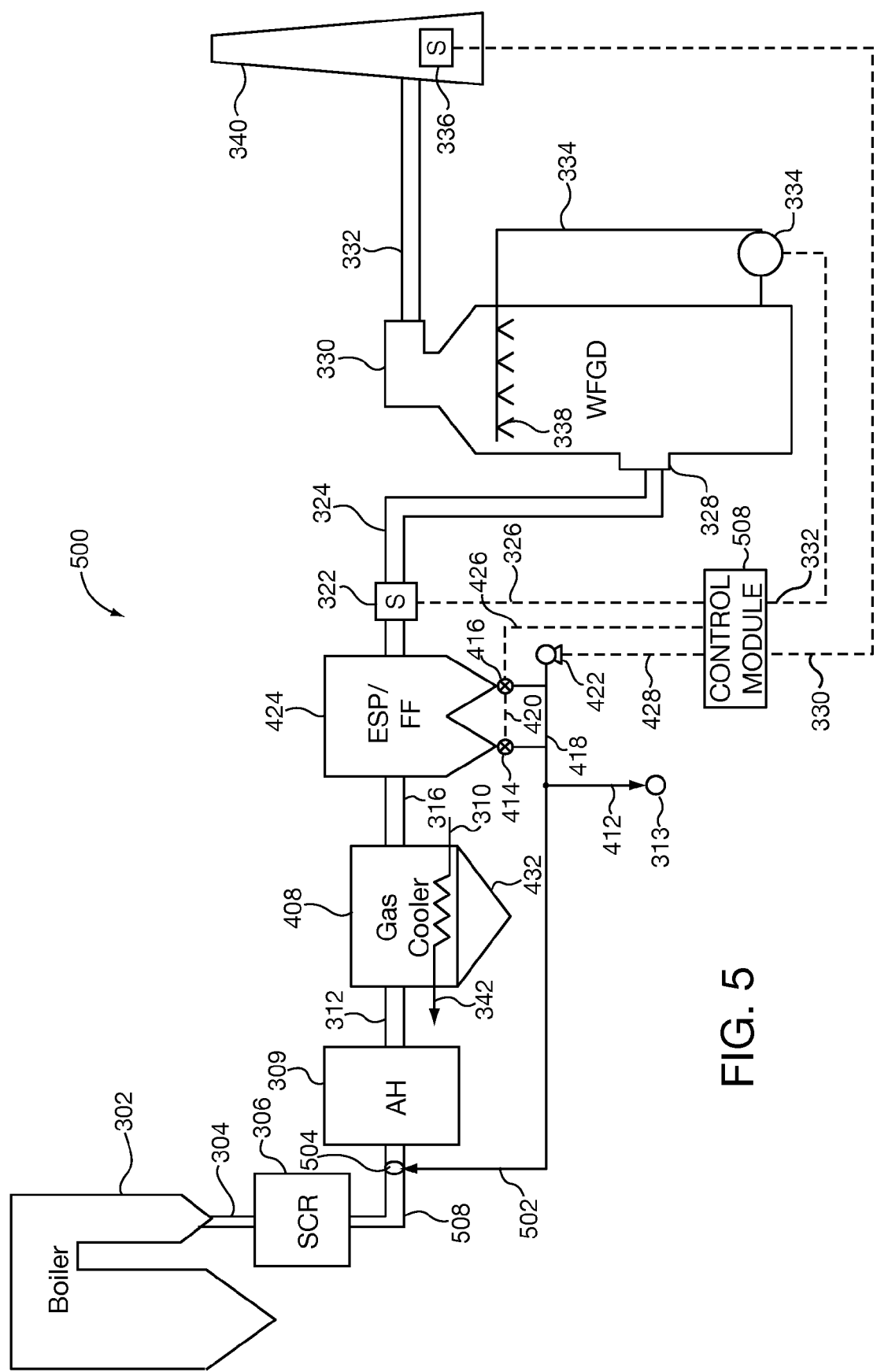

FIG. 5 shows an embodiment 500 similar to that of FIG. 4 but with the injection point of the collected fly ash being upstream of the AH 309 at the location of injection nozzle 504 which is inside the duct 508 connecting the SCR 306 to the AH 309. Ash is supplied to nozzle 504 via pipe 502 which in the FIG. 5 embodiment is connected to the ash hoppers on the particulate collection device 424.

Figure 6:
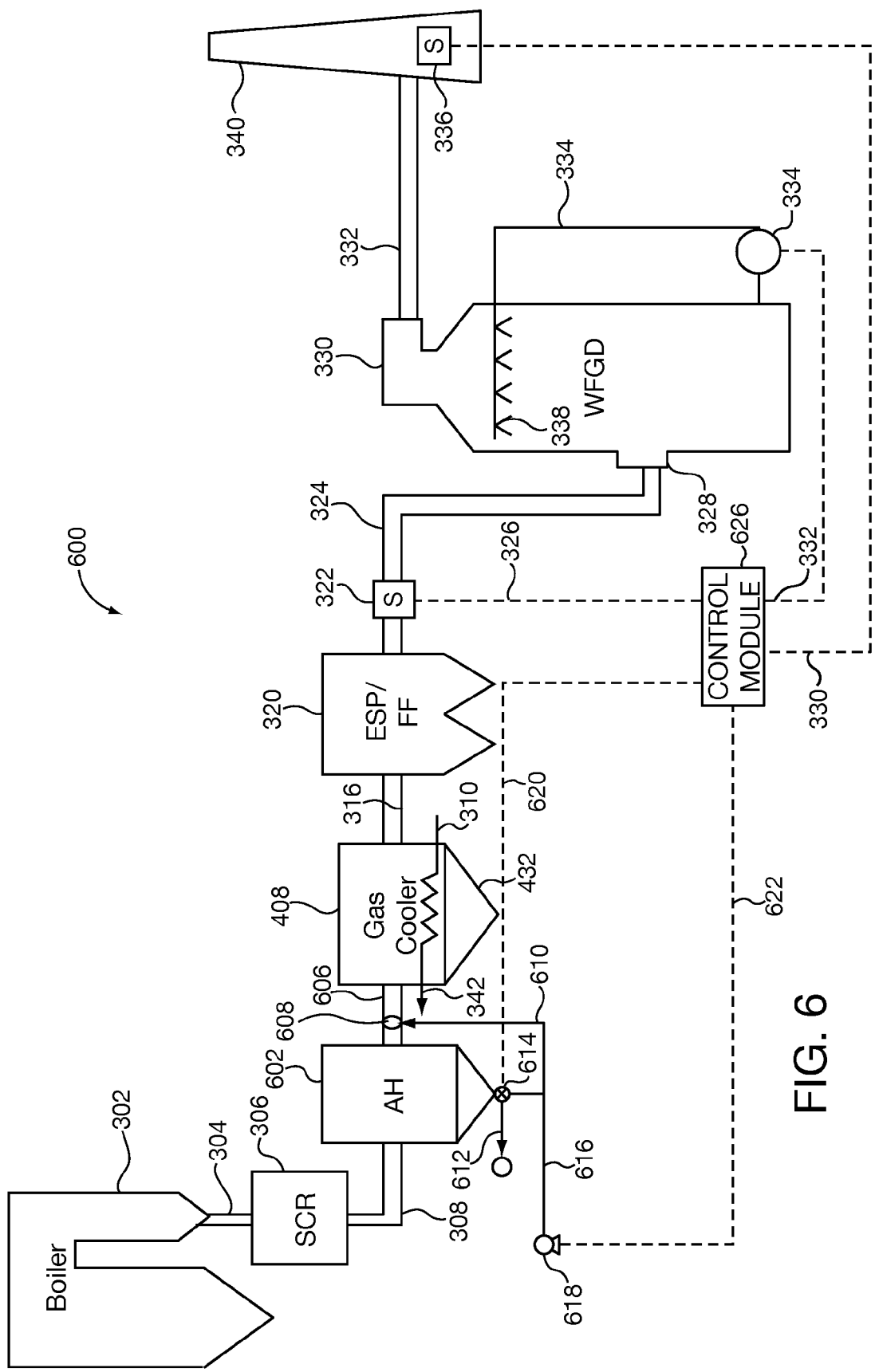

FIG. 6 illustrates an embodiment 600 which is similar to that of FIG. 3 but with ash being collected in a hopper, represented as a triangle at the bottom of the AH 602, located at the AH 602. Control module 626 controls' a blower 618 and value 614 which is used to control the flow of ash from the hopper at the AH 602 to an injection nozzle 608 via pipe 610. The injection nozzle 608 is located in a duct 606 positioned between the AH 602 and gas cooler 408. Excess ash is discharged from the AH hopper for disposal via pipe 612.

Figure 7:
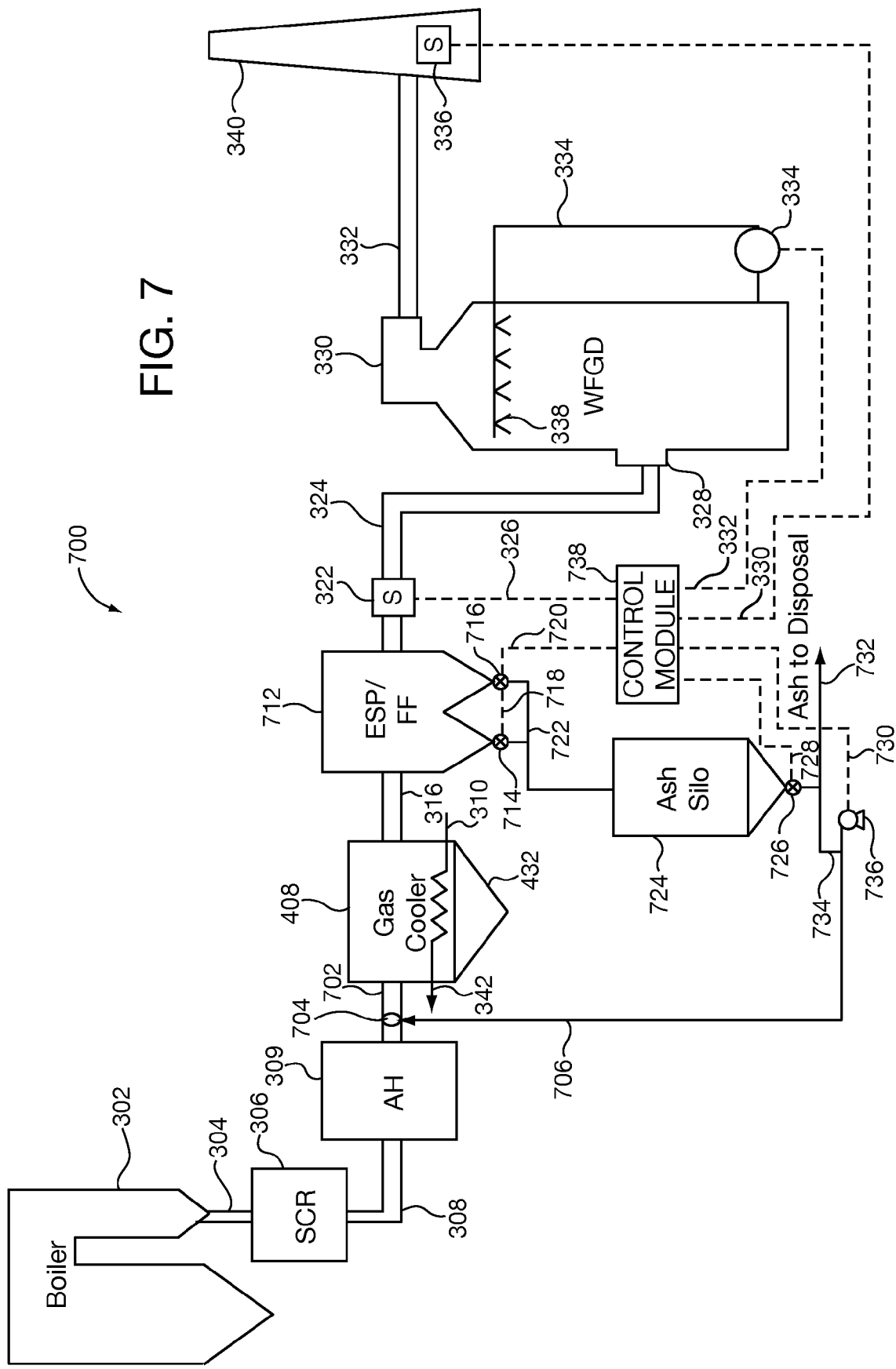

FIG. 7 illustrates an embodiment 700 in which ash is collected from hoppers located on the particulate removal device 712 and/or other collection points in the system. The collected ash from device 712 is supplied to an ash silo 724 via control valves 714, 716. The output of an ash hopper 432 on the gas cooler 408 and/or an ash hopper on the AH 309 may, and in some embodiments are, also coupled to an ash input of the ash silo 724 where ash is collected and stored prior to reuse and/or disposal. Control module 738 controls operation of the various valves 714, 716, 726 and blowers 736 via control lines 718, 720, 728, and 730. The output of ash silo 724 is supplied via valve 726 and pipe 706 to an ash injection nozzle 704 and/or to an ash disposal outlet via pipe 732. In the FIG. 7 embodiment, the ash injection nozzle 704 is positioned between the AH 309 and gas cooler 408 in duct 702.

As discussed above, to facilitate mercury capture, in some embodiment activated carbon is injected into the flue gas stream upstream of the particulate collection device. FIGS. 8 and 9 show system embodiments 800 and 900, respectively, in which activated carbon is injected upstream of the particulate collection device 424. FIG. 8 also shows the optional injection of an additional absorbent material upstream of the gas cooler 408.

In the FIG. 8 and 9 embodiments the control module 818, 908 control the operation of the system and injection of additional absorbent material and/or activated carbon. The activated carbon is stored in silo 850 and supplied via control valve 852 to injection nozzle 856. Blower 854 forces the activated carbon from the silo 850 through nozzle 856 and into the flue gas stream at a point between the gas cooler 408 and the particulate collection device 424. The optional additional absorbent material, which may be one or a combination of the above discussed alkali materials, is supplied via control valve 804 on sorbet silo 802 through pipe 812 to nozzle 814. Blower 806 which is controlled by the control module 818 is responsible for blowing the absorbent material through nozzle 814 into duct 816 which is positioned between SCR 306 and AH 309.

The FIG. 9 system embodiment 900 is similar to the FIG. 8 embodiment 800 but the absorbent injection point is shown positioned following the AH 309 upstream of the gas cooler 408. Thus, in the FIG. 9 embodiment, control module 908 controls the injection of additional absorbent material obtained from silo 802 into duct 906 by controlling valve 804 and blower 806 to blow the absorbent through nozzle 904 which is positioned in duct 906.

Figure 12:
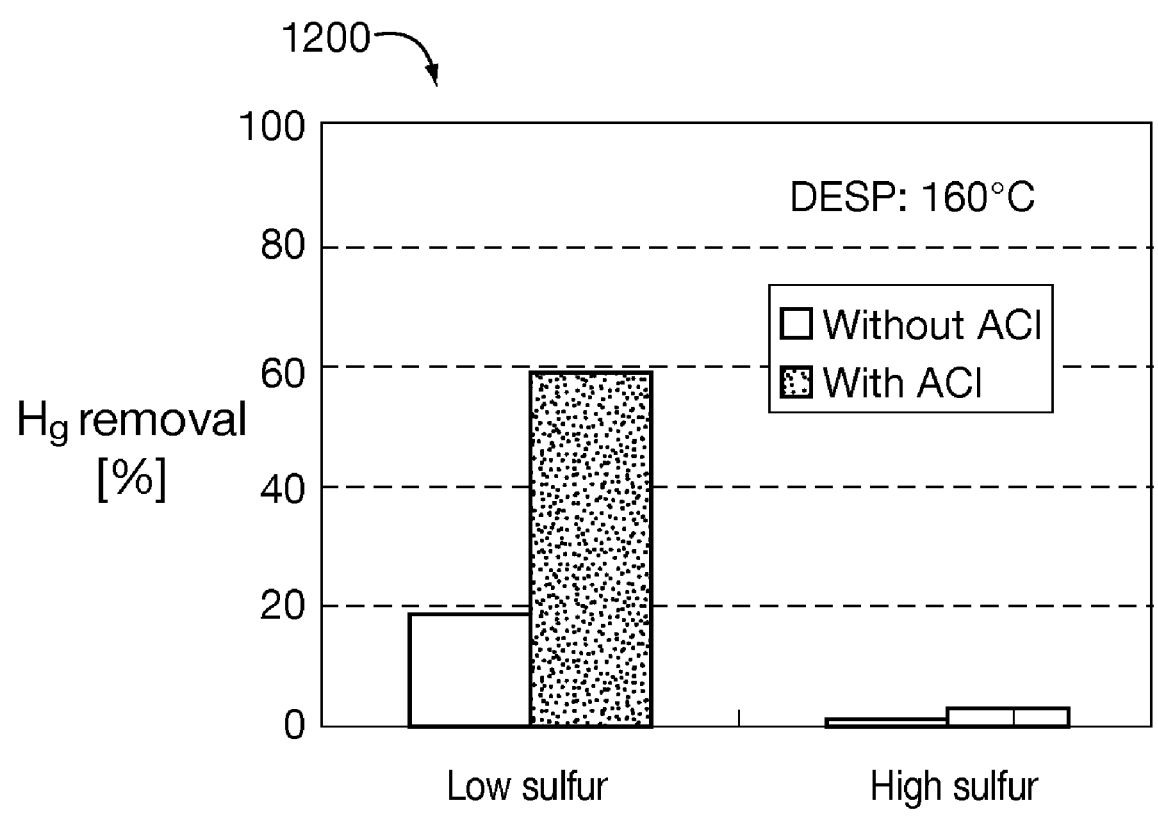

FIG. 12 shows pilot plant test data of mercury removal across the particulate collection device (ESP in this case, maintained at 160 C or 320 F) for a high sulfur coal (3.6% sulfur on dry coal basis) and a low sulfur coal (0.24% sulfur on dry coal basis), and with activated carbon injection, or without (mercury capture by flyash across the ESP). It is clear that significant mercury removal can be obtained for the low sulfur coal, but for high sulfur coal, little mercury was removed regardless of activated carbon injection.

In the test system, the gas cooler was placed after the air preheater but before the dust collection device and activated carbon injection point as shown in FIG. 8. Pilot plant test results with this configuration are plotted in FIG. 11 (for Coal B which has 1.6% sulfur on dry basis).

Figure 11:
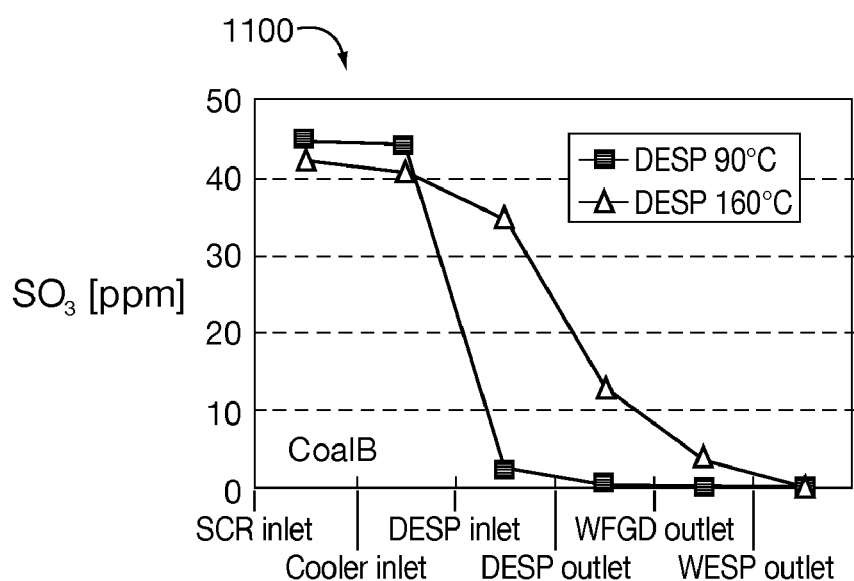
FIGS. 11-12 show test data obtained from a pilot plant implementing various features of the present invention.

FIG. 11 shows test results that indicate that by utilizing the gas cooler 408 to reduce the temperature to about 90 C (194 F) at the dry ESP inlet, most of the flue gas $SO_3$ was removed by the gas cooler 408, and the $SO_3$ concentration at the cooler outlet (ESP inlet) was well below 5 ppm.

By combining the gas cooler with activated carbon injection as shown in FIGS. 8 and 9, test data for three coals shown that mercury removal across the ESP increased dramatically when gas temperature (and thus gas $SO_3$ concentration) was reduced by the gas cooler.

Figure 13:
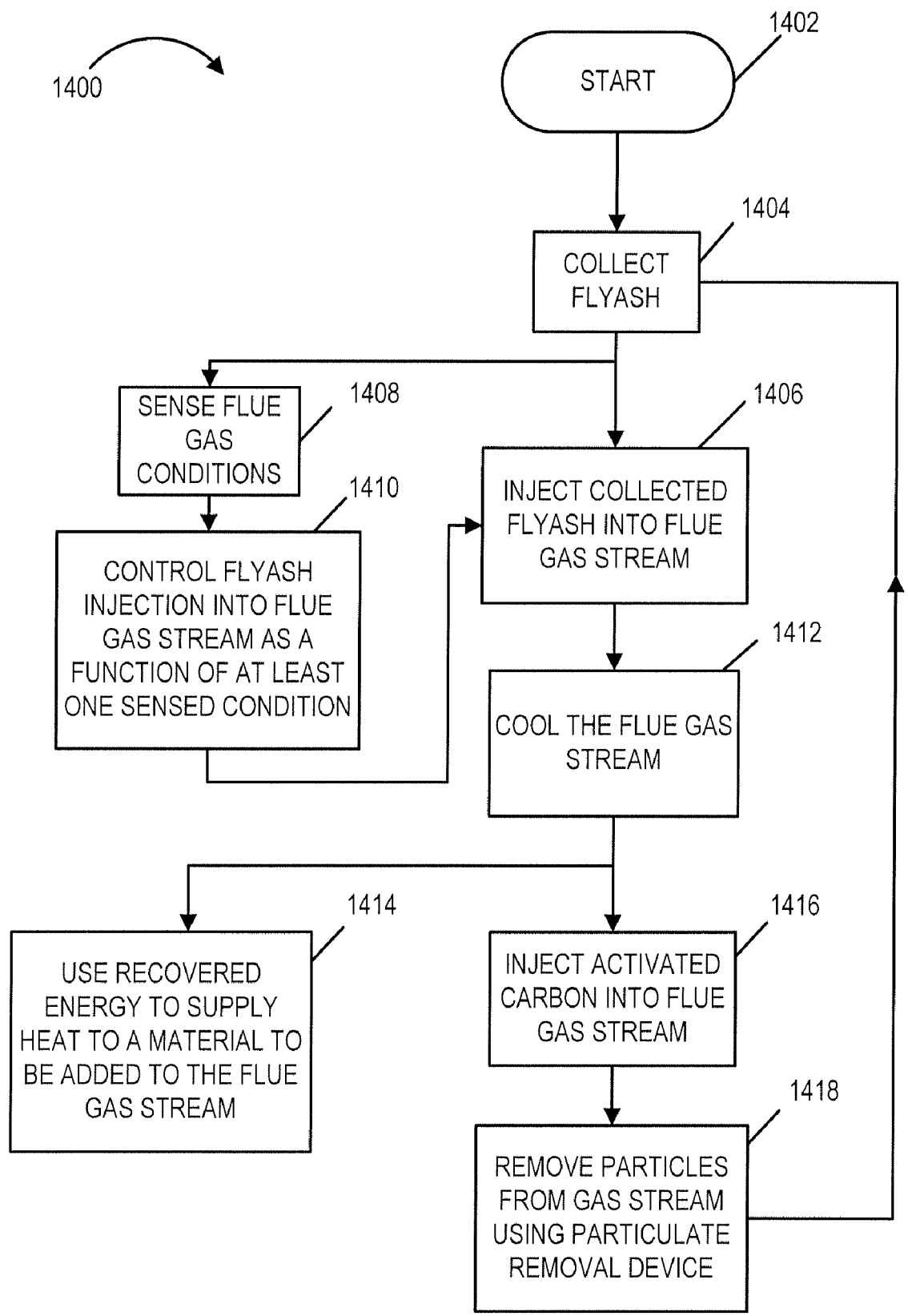
FIG. 13 illustrates the steps of a method implemented in accordance with the invention.

FIG. 13 shows the steps of an exemplary method 1400 implemented in accordance with one embodiment of the present invention. The method starts at step 1402. Then, in step 1404 flyash is collected. The ash may be collected at various locations in the system, e.g., at a flue gas cooler and/or at a particulate removal device. The collected ash may be stored in a hopper on the device at which it is collected and/or transferred to a storage silo. Operation proceeds from step 1404 to step 1406, in which at least some of the collected flyash is injected into the flue gas stream upstream of a gas cooler. In some embodiments, a control device may be used to control the amount of collected fly ash injected to the flue gas stream. Sensors which may be used include, e.g., a gas composition sensor, a temperature sensor, pressure sensors, volume sensors, etc. These sensors may be used to sense one or more conditions of the flue gas stream. Sensing of flue gas conditions occurs in step 1408. Next, in step 1410, based on one or more conditions an amount of fly ash to be injected is determined and injection of collected ash into the flue gas stream is controlled accordingly. Sensing and control steps 1408 and 1410 are optional in that in some embodiments the amount of ash which is to be injected is predetermined based on known coal content and/or other operating conditions. Steps 1408 and 1410, when implemented, may be performed on an ongoing basis along with injection step 1406. Thus, sensing, control and injection steps may be performed in parallel at any given time.

Referring back to injection step 1406 it can be seen that operation moves from step 1406 to step 1412 wherein the flue gas is cooled. In step 1412, the flue gas stream is cooled using a gas cooler which may be implemented as a heat exchange device. In some embodiment the flue gas is cooled down to 220 F or below. Heat extracted as part of cooling step 1412 is used in step 1414. In some embodiments the energy recovered by the gas cooler is used to heat up the turbine condensate prior to reuse of the condensate. This energy can be used to completely or partially replace the steam sometimes required for the first and/or second stage condensate heaters. In other embodiments, the heat energy recovered in cooling step 1412 is used to heat a material to be added to the flue gas stream. The particular use of the recovered energy may vary depending on the particular embodiment. However, some uses such as those mentioned herein have benefits in terms of improving system energy efficiency as compared to known systems which used recovered heat to heat flue gas prior to exhausting from a smoke stack.

In order to reduce mercury emissions, some embodiments include an optional step of adding activated carbon between the flue gas cooler and a particulate removal device. Step 1416 is implemented in some but not necessarily all embodiments and includes the step of injecting, activated carbon into the flue gas stream. Following injection of activated carbon in embodiments where this step is performed operation proceeds to particulate removal step 1418. Operation will proceed directly from cooling step 1412 to step 1418 in cases where activated carbon is not used.

In step 1418, a particulate removal device is used to remove the particle material from the flue gas stream. This may be done using a dry ESP and/or fabric filter in contrast to a wet ESP used in some previous systems.

An arrow connects step 1418 to step 1404, indicating that the process may continue. It should be appreciated that in a normal operating system the steps of FIG. 14 will occur on an ongoing or periodic basis.

Various steps and/or modules described herein may be implemented using software implemented on one or more processors. Accordingly, modules may be interpreted as being hardware, software, or a combination of hardware and software. For example, control module 328 may be implemented as a computer based control system operating under the control of one or more software instructions.

Numerous additional variations on the methods and apparatus of the present invention described above will be apparent to those skilled in the art in view of the above description of the invention. Such variations are to be considered within the scope of the invention.

What is claimed is:

1. A flue gas stream treatment assembly, comprising:
   an ash storage element for storing collected ash;
   a selective catalytic reactor through which the flue gas stream passes;
   an injection module for injecting said ash into the flue gas stream, said injection module having an outlet located within the flue gas stream downstream of the selective catalytic reactor (SCR) and being coupled to said ash storage element; and
   a gas cooler located downstream of said injection module.

2. The flue gas treatment assembly of claim 1, further comprising:
   an energy recovery module for preheating one or both of: i) a material to be injected into the flue gas stream and ii) steam turbine condensate, using energy removed from said flue gas by said flue gas cooling unit.

3. The flue gas treatment assembly of claim 1, further comprising:
   an air heater located in said flue gas stream upstream of the outlet of said injection module for injecting said ash; and
   wherein steam turbine condensate is passed through said gas cooler to absorb heat from said flue gas stream.

4. The flue gas treatment assembly of claim 1, wherein said ash storage element includes one of: i) a hopper at said gas cooler used to store ash collected at said gas cooler from said flue gas stream and ii) a hopper at a particulate removal device used to store ash collected from said flue gas stream.

5. The flue gas treatment assembly of claim 1, further comprising a particulate removal device coupled to said gas cooler.

6. The flue gas treatment assembly of claim 5, wherein said particulate removal device includes an electrostatic participator.

7. The flue gas treatment assembly of claim 5, wherein said particulate removal device includes a fabric filter.

8. The flue gas treatment assembly of claim 4, further comprising:
   an activated carbon storage element; and an activated carbon injection module for injecting activated carbon into said flue gas stream at a point between said gas cooler and said particulate removal device.

9. A flue gas stream treatment assembly, comprising:
an ash storage element for storing collected ash;
an injection module for injecting said ash into the flue gas stream, said injection module having an outlet located within the flue gas stream and being coupled to said ash storage element;
a gas cooler located downstream of said injection module;
an air heater located in said flue gas stream upstream of said gas cooler; and
wherein said ash storage element is a hopper on said air heater used to store ash collected at said air heater from said flue gas stream.

10. The flue gas treatment assembly of claim 9, wherein said injection module is located in said flue gas stream at a point between said air heater and said gas cooler.

11. The flue gas treatment assembly of claim 1, further comprising a particulate removal device coupled to said gas cooler; and
wherein said ash storage element is an ash silo used to store ash removed by said particulate removal device from said flue gas stream.

12. The flue gas treatment assembly of claim 1, further comprising:
an alkali absorbent material storage silo for storing an alkali absorbent material.

13. The flue gas treatment assembly of claim 12, further comprising:
an alkali absorbent material injection module for injecting said alkali absorbent material into said flue gas stream upstream of said gas cooler.

14. The flue gas treatment assembly of claim 13, further comprising:
an air heater located upstream of said gas cooler; and
wherein said ash injection module is located between said air heater and said gas cooler.

15. A flue gas stream treatment assembly, comprising:
an ash storage element for storing collected ash;
an injection module for injecting said ash into the flue gas stream, said injection module having an outlet located within the flue gas stream and being coupled to said ash storage element;
a gas cooler located downstream of said injection module; and
a control module for controlling the amount of ash injected into said flue gas stream, said control module controlling the injection module to inject sufficient ash to keep ash in the gas cooler from becoming wet due to condensation.

16. A flue gas treatment assembly comprising:
an ash storage element for storing collected ash;
an ash injection module for injecting said ash into the flue gas stream, said ash injection module having an outlet located within the flue gas stream and being coupled to said ash storage element;
a gas cooler located downstream of said injection module;
an alkali absorbent material storage silo for storing an alkali absorbent material;
an alkali absorbent material injection module for injecting said alkali absorbent material into said flue gas stream upstream of said gas cooler;
an air heater located upstream of said gas cooler, said ash injection module being located between said air heater and said gas cooler;
wherein said alkali absorbent material injection module coupled to said absorbent material storage element is located upstream of said air heater.

* * * * *